(12) United States Patent
Berger

(10) Patent No.: US 6,371,711 B1
(45) Date of Patent: Apr. 16, 2002

(54) VALVELESS CONTINUOUS ATMOSPHERICALLY ISOLATED CONTAINER FEEDING ASSEMBLY

(75) Inventor: Douglas N. Berger, Kennewick, WA (US)

(73) Assignee: Integrated Environmental Technologies, LLC, Richland, WA (US)

( * ) Notice: Subject to any disclaimer, the term of this patent is extended or adjusted under 35 U.S.C. 154(b) by 0 days.

(21) Appl. No.: 09/272,763

(22) Filed: Mar. 19, 1999

(51) Int. Cl.[7] .............................. F23G 5/44; F23G 7/00; F23K 3/00; F23K 5/00
(52) U.S. Cl. ...................... 414/160; 414/217; 414/198; 110/109; 110/346; 406/191; 373/60
(58) Field of Search ................................. 414/217, 162, 414/166, 198, 160; 285/337, 369; 277/365; 110/109, 346; 406/191; 373/60

(56) References Cited

U.S. PATENT DOCUMENTS

| | | | | |
|---|---|---|---|---|
| 951,665 A | * | 3/1910 | Swindell et al. ............ 414/198 |
| 2,288,904 A | * | 7/1942 | Hudson ....................... 285/337 |
| 2,653,833 A | * | 9/1953 | Barron ........................ 277/365 |
| 3,507,407 A | * | 4/1970 | Kniese ........................ 414/217 |
| 3,767,268 A | * | 10/1973 | Stuzky .......................... 406/83 |
| 4,266,111 A | * | 5/1981 | Trillwood ............. 219/121 EN |
| 4,315,712 A | * | 2/1982 | Seglias ........................ 414/149 |
| 4,718,847 A | * | 1/1988 | Manson ...................... 432/241 |
| 4,812,101 A | * | 3/1989 | George et al. .............. 414/220 |
| 5,117,564 A | * | 6/1992 | Taguchi et al. ................ 34/92 |
| 5,224,118 A | * | 6/1993 | Vance .......................... 373/60 |
| 5,410,121 A | * | 4/1995 | Schlienger ............. 249/121.43 |

\* cited by examiner

*Primary Examiner*—Steven A. Bratlie
(74) *Attorney, Agent, or Firm*—Douglas E. McKinley, Jr.

(57) ABSTRACT

An apparatus for feeding containers of feed material into a process chamber is disclosed. The apparatus is designed to maintain the atmosphere within the process chamber as separate from the atmosphere surrounding the process chamber. The apparatus has a feeder housing having at least two internal seals, which form an airtight seal about the feeding canisters as the canisters are passed through the seals. The seals are separated by a distance less than the length of the container.

5 Claims, 1 Drawing Sheet

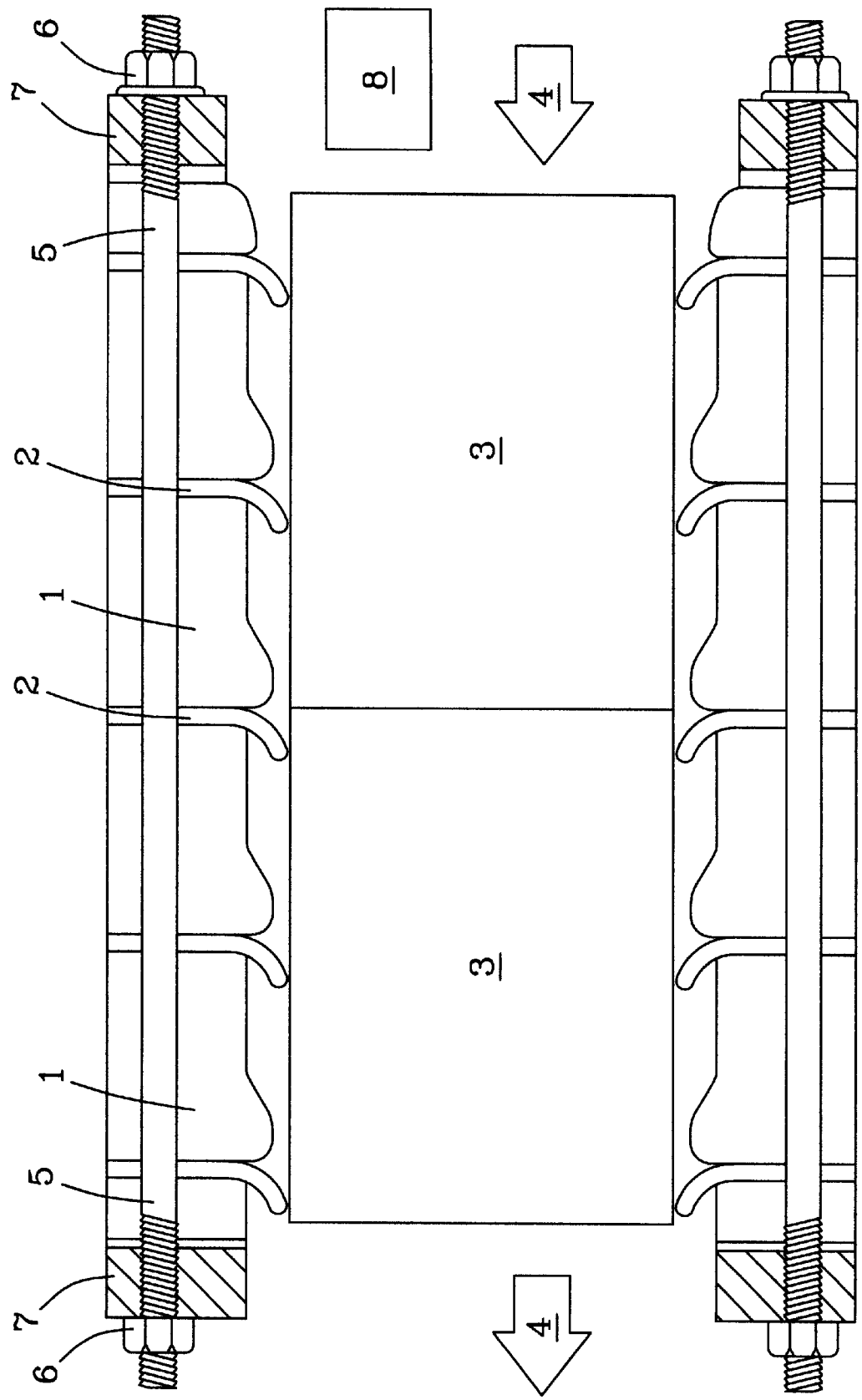

VALVELESS CONTINUOUS ATMOSPHERICALLY ISOLATED CONTAINER FEEDING ASSEMBLY

FIELD OF THE INVENTION

The present invention relates generally to an apparatus for automatically introducing feed materials into a process chamber. More specifically, the present invention relates to an apparatus for automatically and continuously introducing containers of feed materials into a process chamber wherein the atmosphere within the process chamber is kept separate from the atmosphere exterior to the process chamber.

BACKGROUND OF THE INVENTION

The preferred method of treating a great variety of hazardous and other wastes is vitrification. Materials are vitrified when they are heated to high temperatures, and if necessary combined with glass forming materials, to form the materials into a stable, leach resistant glass. Heating these materials may be performed by a variety of methods. For example, it is common to place electrodes (hereinafter joule heating electrodes) in direct contact with the waste materials, and to then pass a current through the materials. In this manner, electrical energy passing between the joule heating electrodes is converted into heat due to the resistive properties of the waste materials, thereby promoting vitrification of the waste materials. In another arrangement, a high electrical potential is generated across a pair of electrodes, or a single electrode and the waste material (hereinafter arc electrodes), to create an ionized gas, or a plasma. A plasma generated in this manner will exhibit high temperatures, ranging from approximately 3,500° C. to over 10,000° C. Heat from the plasma is thus radiated to the surrounding waste material.

In U.S. Pat. No. 5,666,891, titled "Arc Plasma-Melter Electro Conversion System for Waste Treatment and Resource Recovery" to Titus et al. and incorporated herein by reference, a variety of particularly useful configurations are shown wherein joule electrodes are used in systems in various combinations with arc electrodes. In these arrangements, organic compounds contained in the waste are destroyed by pyrolysis, wherein the high temperatures of the plasma break the chemical bonds of the organic molecules. By introducing steam to the process chamber, these pyrolyzed organic constituents are converted into a clean burning fuel consisting primarily of $CO$, $CO_2$ and $H_2$ through a steam reforming reaction. Other constituents of the waste, which are able to withstand the high temperatures without becoming volatilized (such as certain hazardous metals and radioactive species) may be made to form into a molten state which then cools to form a stable glass. By carefully controlling the vitrification process, the resulting vitrified glass may be made to exhibit great stability against chemical and environmental attack, with a high resistance to leaching of the hazardous and or radioactive components bound up within the glass. In this manner, vitrification may be utilized to convert waste materials into a high quality fuel gas and a stable, environmentally benign, glass.

Because of the volatile nature of the clean burning fuels and the toxic nature of hazardous metals and radioactive species treated in the pyrolysis/steam reforming/vitrification process, it is desirable that the region wherein heating takes place and the fuel gasses are generated be kept separated from the ambient atmosphere. At the same time, as materials are vitrified and pyrolyzed, more materials must be fed into the process chamber. To feed new materials into the process chamber while maintaining the atmosphere of the process chamber separate from the outside ambient atmosphere, prior art processes have relied on a variety of feeding mechanisms. Some of these feeding mechanisms utilize arrangements such as a series of valves through which the waste materials are fed. While these types of feeding systems may maintain a separated atmosphere, they have numerous drawbacks. First, they may be very expensive due to the quantity of moving parts required. Also, these same moving parts may break, rendering these systems unreliable. These and other drawbacks of the prior art have created a need for improved apparatus allowing the continuous introduction of waste materials into a process chamber while maintaining the atmosphere within the process chamber as separate from the atmosphere exterior to the process chamber.

SUMMARY OF THE INVENTION

Accordingly, the present invention is an apparatus for automatically introducing materials into a process chamber wherein the atmosphere within the process chamber is kept separate from the atmosphere exterior to the process chamber. The present invention consists of an air-tight tube, hereinafter referred to as the feeder housing, having at least two internal seals, an outer seal and an inner seal. The seals are preferably "O" shaped rings constructed of a flexible material such as rubber or a similar elastomer. While the benefits and advantages of the present invention may be realized with as few as two seals, preferably, but not meant to be limiting, at least five seals are employed. Preferably, the seals are interleaved among flanges that hold the seals in position. The combination of seals and flanges are then held tightly together by some means including but not limited to an adhesive, a clamp, a bolt and nut compression assembly, or some combination thereof. Thus configured, the seals and flanges together form the air-tight feeder housing. One end of the feeder housing is then sealed to the entrance to a process chamber. Materials may then be fed into the other end of the feeder housing while maintaining the atmosphere within the feeder housing as separate from the atmosphere on the exterior of the feeder housing.

Materials are first placed into containers which may then be introduced into the feeder housing. Preferably, these containers are cylindrical. The cylindrical containers are selected such that their external diameter is slightly larger than the internal diameter of the seals. Thus, as the containers travel through the seals, the inner surface of the seals form an air-tight seal about the circumference of the container, preventing the flow of gas around the container and through the feeder housing. Preferably, the containers are longer than the maximum distance between any two adjacent seals, thus insuring that as successive containers travel through the feeder housing, at least one air tight seal is always formed about at least one container. More preferably, the containers are longer than double the maximum distance between any two adjacent seals, thus forming two and three airtight seals, respectively, about any two adjacent containers. As will be apparent to those having skill in the art, the seals and containers may be constructed with other than circular shapes, however, "O" shaped seals and cylindrical containers are preferred as this configuration tends to form the most reliable leak resistant interface between the seal and the container.

Containers are positioned at the entrance to the feeder housing and then pushed into the feeder housing. By way of example, and not meant to be limiting, it is preferred that the containers are introduced into the feeder housing with a plunger or similar automated mechanism. As containers are introduced into the feeder housing, a plurality of containers become stacked end to end in the interior of the feeder housing. As new containers are introduced into the feeder housing, containers within the feeder housing are displaced into the process chamber. In this manner, a continuous stack of containers are fed through the feeder housing, and an air tight seal is continually maintained about one or more of the containers.

OBJECTS

Accordingly, it is an object of the present invention to provide a feeder housing for introducing materials into a process chamber wherein the atmosphere within the process chamber is kept separate from the atmosphere exterior to the process chamber.

It is a further object of the present invention to provide a feeder housing having at least two internal seals for automatically introducing materials contained within containers into a process chamber wherein the atmosphere within the process chamber is kept separate from the atmosphere exterior to the process chamber.

It is a further object of the present invention to provide a feeder housing for introducing containers into a process chamber having at least two seals interleaved among flanges through which containers are inserted wherein the seals form an air tight seal about the outer circumference of the containers.

It is a further object of the present invention to provide a feeder housing for introducing containers into a process chamber having at least two seals through which containers are inserted wherein the seals form an air tight seal about the outer circumference of the containers.

BRIEF DESCRIPTION OF THE DRAWINGS

FIG. 1 is a cut away, schematic view of a first prototype built to demonstrate a preferred embodiment of the present invention.

DESCRIPTION OF THE PREFERRED EMBODIMENT(S)

"A prototype assembly was constructed to demonstrate the advantages of the present invention. As shown in the cut away view of the prototype device in FIG. 1., the feeder housing is constructed by interleaving spacers 1 and seals 2. Canisters 3 are inserted into the feeder housing in the direction shown by the arrows 4. As canisters 3 are inserted into the feeder housing, seals 2 form an airtight seal about the circumference of the canisters 3. As shown in FIG. 1, the last spacers 1a encountered by the canisters 3 prior to the seals 2 slope towards the interior of the feeder housing. In this manner, the canisters 3 are guided toward the center of the seals 2. A clamping assembly consisting of a clamp ends 7, bolt 5 and nuts 6 holds the interleaved spacers 1 and seals 2 in an airtight column. The feeder housing is attached to a process chamber (not shown) to allow canisters 3 to be inserted into the process chamber without allowing the passage of ambient atmosphere into the process chamber or the passage of gasses within the process chamber into the ambient atmosphere. Canisters 3 may be pushed into the feeder housing manually or by automated means including, but not limited to hydraulic or screw activated plungers 8."

While a preferred embodiment of the present invention has been shown and described, it will be apparent to those skilled in the art that many changes and modifications may be made without departing from the invention in its broader aspects. For example and while not to be construed as limiting, seals and flanges in accordance with the present invention are preferably constructed in the form of circles such that cylindrical containers will seal most effectively as they are inserted through the feeder housing. It will be appreciated by those skilled in the art, however, that other constructions can be utilized in accordance with the teachings of the present invention. The appended claims are therefore intended to cover all such changes and modifications as fall within the true spirit and scope of the invention.

I claim:

1. An apparatus for feeding disposable containers into a process chamber which maintains the atmosphere within the process chamber as separate from the atmosphere surrounding the process chamber comprising an air-tight feeder housing having at least two internal seals, said seals being spaced no further apart than the length of said disposable containers.

2. The apparatus of claim 1 wherein the feeder housing comprises said seals interleaved with flanges.

3. The apparatus of claim 1 wherein the feeder housing comprises at least five seals interleaved with flanges.

4. The apparatus of claim 1 further comprising an automated means for introducing said containers into the feeder housing.

5. The apparatus of claim 4 wherein the automated means for introducing said containers into the feeder housing is selected from the group comprising hydraulic or screw activated plungers.

\* \* \* \* \*